No. 810,706. PATENTED JAN. 23, 1906.
C. A. BOYER & D. C. PECK.
STOVEPIPE.
APPLICATION FILED OCT. 15, 1904.
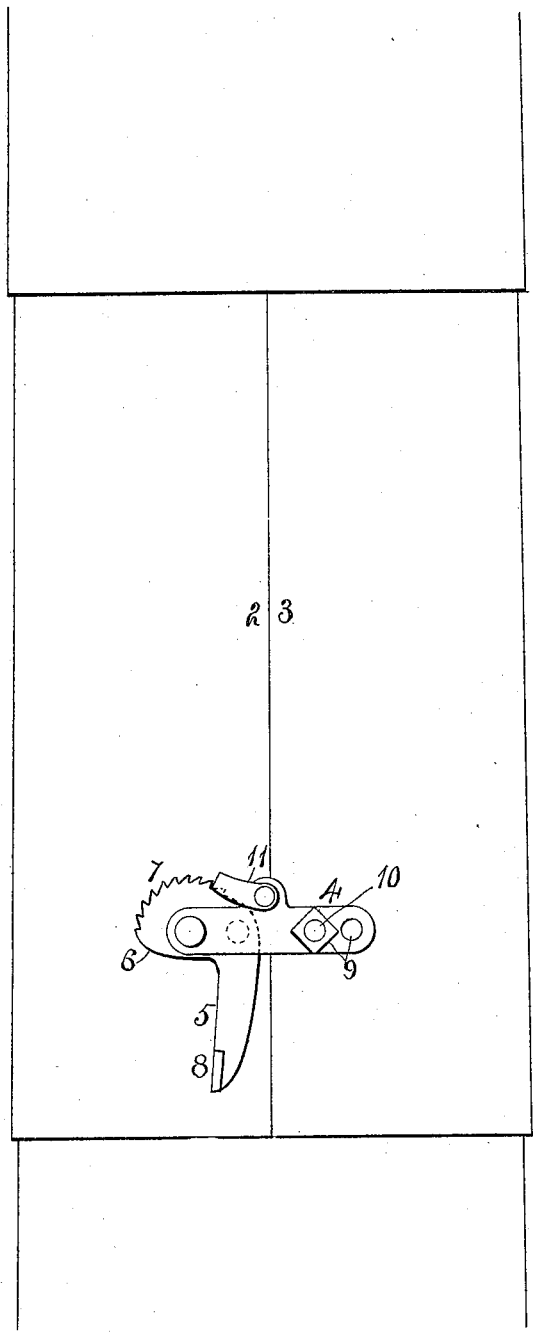
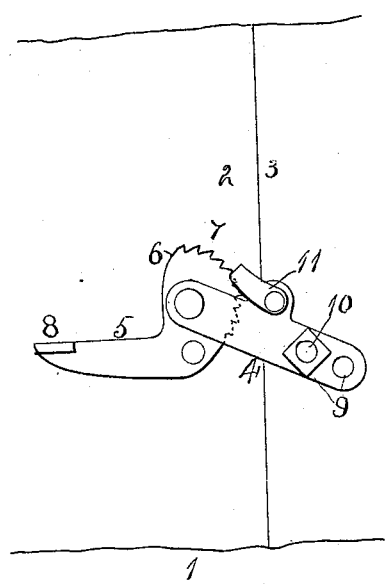
Witnesses:
F. F. Cox
E. Behel
Inventors:
Charles A. Boyer
Daniel C. Peck
By A. O. Behel
Atty.

UNITED STATES PATENT OFFICE.

CHARLES A. BOYER AND DANIEL C. PECK, OF MARENGO, ILLINOIS.

STOVEPIPE.

No. 810,706.  Specification of Letters Patent.  Patented Jan. 23, 1906.

Application filed October 15, 1904. Serial No. 228,592.

*To all whom it may concern:*

Be it known that we, CHARLES A. BOYER and DANIEL C. PECK, citizens of the United States, residing at Marengo, in the county of McHenry and State of Illinois, have invented certain new and useful Improvements in Stovepipes, of which the following is a specification.

This invention relates to improvements in stovepipes in which the pipe has a lengthwise open seam, the edges of which are connected at one end of the pipe by an adjustable fastening.

In the accompanying drawings, Figure 1 is an elevation of our improvements in connection with a length of pipe. Fig. 2 shows the connection with the parts partially expanded. Fig. 3 is an isometrical representation of the dog.

The section of pipe 1 has its edges 2 and 3 overlapping and capable of separation. To the edge 2 of the section is pivotally connected a lever 5, having a cam-shaped end 6, which is formed with teeth 7. This lever has a projection 8, forming a thumb-hold. To the lever 5 is pivotally connected a bar 4. The teeth 7 are formed in a segment of a circle around the pivotal center of the lever 5 in its connection with the bar 4. One end of this bar 4 has a series of holes 9, which are adapted to receive a bolt 10, extending from the section near the edge 3. A dog 11 has a pivotal connection with the bar 4 intermediate its ends and is adapted to engage the teeth 7.

As the pivotal point of connection between the bar 4 and the lever 5 is off the center with respect to the pivotal point of connection between the lever 5 and the stovepipe, it is evident that a movement of the lever will contract or expand the size of the end of the section to which the fastening is connected and the dog will hold the lever in its adjusted position. This section of stovepipe is intended to be used in setting up a stove and is adapted to connect with other sections of pipe; but the fastening can be used on pipes for other uses.

We claim as our invention—

1. A pipe-section having two lengthwise overlapping edges, a peripherally-toothed element having a connection with said section near one edge thereof, a strap or bar having an eccentric connection at one end with said toothed element and at its other end connected to the opposite edge of the pipe-section, and a dog adapted to engage said peripherally-toothed element to lock the same against movement in one direction.

2. A pipe-section having two lengthwise overlapping edges, a peripherally-toothed element having a pivotal connection with the said section near one edge thereof, a bar eccentrically connected at one end to said toothed element and at its other end to the opposite edge of the pipe-section, and a dog carried by said bar adapted to engage the teeth on the said toothed element.

3. A pipe-section having two lengthwise overlapping edges, a peripherally-toothed element having a pivotal connection with the said section near one edge thereof, a bar eccentrically connected at one end to said toothed element and having an adjustable connection at its other end with the opposite edge of the pipe-section, and a dog carried by said bar adapted to engage the teeth on the toothed element.

4. A pipe-section having two lengthwise overlapping edges, a peripherally-toothed cam-lever pivotally connected to said section at one edge thereof, a bar eccentrically connected at one end to said cam-lever and having a detachable connection at its other end to the opposite edge of the pipe-section, and a dog carried by said bar adapted to engage the teeth on the cam-lever.

CHARLES A. BOYER.
DANIEL C. PECK.

Witnesses:
J. B. BABCOCK,
ED. J. BAILEY.